United States Patent
Resch et al.

(10) Patent No.: US 12,169,758 B2
(45) Date of Patent: Dec. 17, 2024

(54) RUNNING INSTANCES OF A QUANTUM PROGRAM CONCURRENTLY ON A QUANTUM PROCESSOR

(71) Applicant: Advanced Micro Devices, Inc., Santa Clara, CA (US)

(72) Inventors: Salonik Resch, Minneapolis, MN (US); Anthony Gutierrez, Seattle, WA (US); Yasuko Eckert, Redmond, WA (US); Vedula Venkata Srikant Bharadwaj, Bellevue, WA (US); Mark H. Oskin, Bellevue, WA (US)

(*) Notice: Subject to any disclaimer, the term of this patent is extended or adjusted under 35 U.S.C. 154(b) by 448 days.

(21) Appl. No.: 17/491,304

(22) Filed: Sep. 30, 2021

(65) Prior Publication Data

US 2023/0094508 A1     Mar. 30, 2023

(51) Int. Cl.
*G06F 9/48*     (2006.01)
*G06F 11/36*    (2006.01)
*G06N 10/00*    (2022.01)

(52) U.S. Cl.
CPC .......... *G06N 10/00* (2019.01); *G06F 9/4843* (2013.01); *G06F 11/3612* (2013.01)

(58) Field of Classification Search
CPC ........ G06N 10/00; G06N 10/40; G06N 10/60; G06N 10/80; G06F 9/4843; G06F 11/3612; G06F 9/5061
See application file for complete search history.

(56) References Cited

U.S. PATENT DOCUMENTS

| | | | |
|---|---|---|---|
| 11,010,145 B1 * | 5/2021 | Smith | G06N 10/00 |
| 11,121,725 B2 * | 9/2021 | Murali | H03M 13/611 |
| 11,436,519 B1 * | 9/2022 | Dridi | G06N 10/60 |

FOREIGN PATENT DOCUMENTS

WO    WO 2022/228224    * 11/2022

* cited by examiner

*Primary Examiner* — Nghia M Doan (57) ABSTRACT

An electronic device includes a quantum processor having a plurality of qubits and a processor. The processor runs a plurality of instances of a quantum program substantially in parallel on the quantum processor using a separate set of qubits from among the plurality of qubits for each instance of the quantum program. The processor then acquires an output for each instance of the quantum program from the quantum processor. The processor next uses the outputs for generating an output of the quantum program.

20 Claims, 4 Drawing Sheets

RUNNING INSTANCES OF A QUANTUM PROGRAM CONCURRENTLY ON A QUANTUM PROCESSOR

BACKGROUND

Related Art

Quantum computing is a technical field in which quantum processors with quantum elements such as qubits (e.g., Josephson junctions, etc.) are used for running quantum programs for performing computational operations. Current quantum processors include relatively small numbers of qubits, such as the 65 qubits found in International Business Machine's (IBM's) Quantum Hummingbird® as of February 2021. Quantum processors with thousands of qubits, however, are expected to be available in the year 2023 and beyond. Despite the expected advances in quantum processor design, quantum processors will remain in the so-called noisy intermediate-scale quantum (NISQ) era for years to come. In the NISQ era, quantum processors will be limited to relatively small numbers of qubits (i.e., up to a few thousand qubits) that are "noisy," in that the quantum programs running on the quantum processors can experience errors due to limited coherence time for the qubits, quantum gate errors, qubit measurement errors, etc. Due to the noisiness of qubits in the NISQ era, quantum programs will be limited to shallower "depths." That is, quantum programs will be limited in the number and/or type of operations that can be included in the quantum programs without an unacceptably high likelihood of encountering errors while running on a quantum processor due to noisy qubits. While some error correction is possible with larger numbers of qubits (e.g., hundreds of thousands of qubits), in the NISQ era, error correction is not feasible due to the relatively small number of qubits. Operating without error correction only adds to the limitations on the depth of the quantum programs that can be reliably executed on quantum processors.

In view of the errors that can occur due to noisy qubits, designers have proposed a number of different solutions for reliably running quantum programs on quantum processors. For one solution, designers have proposed using variational quantum algorithms (VQAs) as the quantum programs. VQAs are more viable than other forms of quantum programs due to a "hybrid" scheme used for executing VQAs. For the hybrid scheme, VQAs use quantum processors for running quantum programs with adjustable parameters and rely on ordinary, or "classical," processors (e.g., central processing units, graphics processing units, etc.) for setting and adjusting the parameters for runs of the quantum programs. In operation, the processor causes the quantum processor to run the VQAs numerous times (e.g., hundreds of times), with the processor setting/adjusting the parameters prior to some or all of the runs of the VQAs. The processor acquires outputs (i.e., results) generated during each of the runs of the VQA from the quantum processor and then generates an overall output for the VQA based on the outputs from the runs of the VQA. By collecting the outputs from numerous runs of the quantum program and generating an overall output therefrom, the hybrid scheme can help to overcome some of the effects of errors encountered due to noisy qubits. Even with the hybrid scheme, however, only relatively shallow quantum programs can be run on a quantum processor without experiencing unacceptably high error likelihood due to noisy qubits. Unfortunately, limiting the VQAs to shallow depth results in the VQAs only using a small number of the available qubits in a quantum processor, particularly in quantum processors with hundreds or thousands of qubits. In other words, despite using the hybrid scheme, running a single VQA on a quantum processor can significantly underutilize quantum processor hardware such as qubits.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described implementations and is provided in the context of a particular application and its requirements. Various modifications to the described implementations will be readily apparent to those skilled in the art, and the general principles described herein may be applied to other implementations and applications. Thus, the described implementations are not limited to the implementations shown, but are to be accorded the widest scope consistent with the principles and features described herein.

Terminology

In the following description, various terms are used for describing implementations. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some implementations, functional blocks perform operations "in hardware," using circuitry that performs the operations without executing program code.

Substantially in parallel: substantially in parallel, as used herein for describing running two or more instances of a quantum program on respective sets of qubits on a quantum processor, indicates that the instances of the quantum program are, to at least some extent, running concurrently, contemporaneously, simultaneously, etc. on the quantum processor. For example, two or more instances of the quantum program may be started at, or close to, a same time on respective sets of qubits and then run concurrently to completion on the respective sets of qubits. As another example, different instances of a quantum program can run independently on respective sets of qubits, with a new instance of the quantum program being started on each set of qubits when a prior instance has completed. Given that run times are not always identical for the sets of qubits, starting a new instance of the quantum program on each set of qubits may occur at different times—and thus instances may run concurrently on the respective sets of qubits, but start times and/or finish times for the different instances may not align.

Overview

In the described implementations, an electronic device includes a quantum processor with a set of qubits and quantum gates (e.g., phase shift gates, rotation gates, etc.) for performing operations on the qubits. The quantum processor is used for executing quantum programs that include sequences of quantum gate operations on qubits. After the quantum gate operations of a quantum program have been performed on the qubits, measurement elements in the quantum processor measure the qubits and return a output of the quantum program based on the measurements. The electronic device also includes a processor, which can also be called a "classical" processor, such as a central processing unit (CPU) or graphics processing unit (GPU). The processor is used for executing various software programs (e.g., applications, operating systems, etc.). The quantum processor and processor are used together in a "hybrid" scheme for executing quantum programs such as variational quantum algorithms (VQAs). For the hybrid scheme, the processor causes the quantum processor to run the quantum program a number of times to generate a set of outputs, i.e., outputs from each time that the quantum program is run. The processor acquires and processes the set of outputs to generate an overall output (i.e., result) for the quantum program. In some of these implementations, the quantum program is parameterized, i.e., includes one or more parameters that can be set/adjusted before the quantum program is run on the quantum processor. In these implementations, the processor may also set/adjust the parameters before some or all of the runs of the quantum program on the quantum processor.

In the described implementations, in the hybrid scheme, the processor runs two or more instances of a quantum program on the quantum processor substantially in parallel using separate sets of the qubits in the quantum processor. As described above, because the likelihood of encountering an error becomes unacceptably high with quantum programs that use larger numbers of qubits due to noisy qubits, quantum programs typically use smaller numbers of qubits. Because the quantum processor can include large numbers of qubits (e.g., hundreds or thousands of qubits), if only a single instance of a quantum program was to be run on the quantum processor at a given time, qubits and other quantum processor resources may sit idle. In order to avoid this issue, the processor runs multiple instances of the quantum program substantially in parallel on the quantum processor using a separate set of the quantum processor's available qubits for running each instance of the quantum program. For example, the processor may start running each of two or more instances of the quantum program at around the same time using respective sets of qubits and allow each of the two or more instances of the quantum program to run to completion before starting another two or more instances of the quantum program on each of the sets of qubits—or on different sets of qubits.

In some implementations, for running the instances of the quantum program substantially in parallel on the quantum processor, the processor first selects a separate set of qubits from among the qubits in the quantum processor to be used to run each instance of the quantum program. The processor then runs each instance of the quantum program using the respective set of qubits. The processor next acquires an output generated by the quantum processor for each instance of the quantum program, such as by reading outputs from measurement elements for the respective set of qubits. The processor then uses the combined outputs for generating an overall output for the quantum program. That is, the processor acquires the output for each instance of the quantum program and then uses one or more statistical, mathematical, and/or logical operations on the outputs to determine an overall output for the quantum program.

The above-described process for running the instances of the quantum program can be considered running one "batch" of instances of the quantum program. In other words, a collection of instances of the quantum program run substantially in parallel on the quantum processor can be called a batch. The batch can be but one batch among two or more—and possibly a large number of—batches of the quantum program that are run on the quantum processor. In some implementations, outputs from the batch of instances of the quantum program are combined with outputs generated by other batches of instances of the quantum program to be used in determining the overall output of the quantum program (i.e., via one or more statistical, mathematical, and/or logical operations).

In some implementations, the processor selects qubits to be included in each set of qubits as described above based on the operations in the quantum program and an arrangement of qubits in the plurality of qubits. For example, in some implementations, the processor can compare properties of qubits and capabilities of the quantum processor (e.g., connectivity between qubits, the operations supported by quantum gates in the quantum processor, etc.) with the operations to be performed for the quantum program when determining the separate sets of qubits. For instance, the processor can select sets of qubits that neighbor one another (or have another specified connectivity) when two or more qubits are to interact for operations of the quantum program in order to avoid the need for moving quantum state, or "swapping" quantum state, between qubits in the quantum processor. In some implementations, the processor selects qubits to be included in each set of qubits as described above using quality metrics associated with individual qubits and/or groups of qubits. In these implementations, the quantum processor, processor, and/or another entity can keep quality metrics for qubits or groups thereof, such as metrics indicative of coherence time for the qubits, quantum gate error rates, measurement element errors, etc. When selecting sets of qubits in these implementations, the processor uses the quality metrics to ensure that an average, sum, etc. of the quality metrics for each set of qubits meets a quality threshold.

In some implementations, the processor select a number of instances of the quantum program to be run substantially in parallel on the quantum processor based on operations of the quantum program and an arrangement of qubits in the plurality of qubits. In these implementations, although there may be sufficient qubits to run a given number of instances (i.e., X instances) of the quantum program substantially in parallel, the processor may select a number of instances that is less than the given number of instances (i.e., Y<X instances). For example, although there may be a given number of available qubits that might be selected for running an instance of the quantum program, running the quantum program on the instances may be inefficient (e.g., require quantum state swaps, etc.) or error prone. In this case, the processor may choose not to use the given number of available qubits—and thus may select less than the maximum possible number of instances of the quantum program to be run on the quantum program.

In some implementations, the processor collects run-quality metrics after specified instances of the quantum program have run substantially in parallel on the quantum processor. For example, the processor can collect the run-quality metrics after each batch of instances has run, after each Nth batch has run (N=2, 5, or another number), etc. The processor then uses the run-quality metrics to update the number of instances of the quantum program to be run substantially in parallel and/or the sets of qubits upon which the instances of the quantum program are run for subsequent batches. For example, the run-quality metrics can include metrics such as an error magnitude or deviation from a specified value in the outputs for one or more instances of the quantum program, error rates for multiple instances of the quantum program, etc. In these implementations, if the run-quality metrics are below a threshold value—indicating that one or more instances of the quantum program produced sub-standard or deviant outputs—the processor can run fewer instances of the quantum program substantially in parallel on the qubits, can avoid running instances of the quantum program on particular qubits or combinations thereof, etc.

In some implementations, the processor uses a quality associated with an output from running each instance of the quantum program to control how that output contributes to the overall output for the quantum program. In these implementations, the quantum processor, processor, and/or another entity keeps quality metrics for qubits or groups thereof, such as metrics indicative of coherence time for the qubits, gate errors or fidelity, measurement errors, a number of connections between qubits, etc. The processor uses the quality metrics to adjust the outputs from each instance of the quantum program based on quality metrics associated with the set of qubits used to generate that output. For example, in some of these implementations, the processor weights each of the outputs based on quality metrics for the set of qubits used to generate that output. In these implementations, outputs generated by qubits associated with lower quality metrics are given less weight, and thus have smaller influence on the overall output of the quantum program, and outputs generated by qubits associated with higher quality metrics are given more weight, and thus have larger influence on the overall output of the quantum program.

By using qubits in a quantum processor for running multiple instances of a quantum program on the quantum processor substantially in parallel, the described implementations avoid leaving the qubits and other elements in the quantum processor idle. In addition, the described implementations, more rapidly run instances of the quantum program (in contrast to existing systems in which the instances of the quantum program are run one at a time in a serial sequence on the quantum processor). By using the operations of the quantum program and arrangement of the qubits to determine the number of instances of the quantum program to be run substantially in parallel and/or the qubits to be included in sets of qubits for running instances of the quantum program, some implementations use the available qubits more efficiently (or do not use certain qubits) for running instances of the quantum program. By weighting the outputs from instances of the quantum program using run-quality metrics, some implementations generate overall outputs that are more likely to be correct and useful. In this way, operation of the quantum processor is sped up and improved, which improves the performance of the electronic device. Improving the performance of the electronic device improves user satisfaction with the electronic device.

Electronic Device

Figure 1:
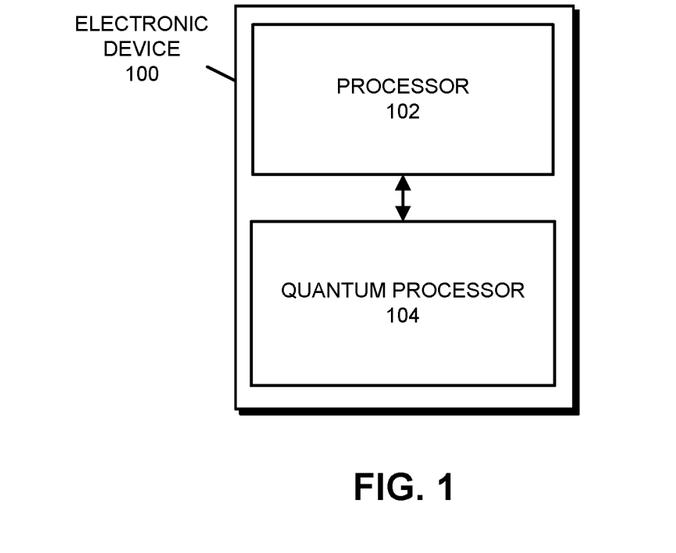
FIG. 1 presents a block diagram illustrating an electronic device in accordance with some implementations.

FIG. 1 presents a block diagram illustrating electronic device 100 in accordance with some implementations. As can be seen in FIG. 1, electronic device 100 includes processor 102 and quantum processor 104. Processor 102 and quantum processor 104 are implemented in "hardware," i.e., using corresponding integrated circuitry, discrete circuitry, and/or devices. For example, in some implementations, processor 102 and quantum processor 104 are implemented in integrated circuitry on one or more semiconductor chips, are implemented in a combination of integrated circuitry on one or more semiconductor chips in combination with discrete circuitry and/or devices, or are implemented in discrete circuitry and/or devices.

Processor 102 is a functional block that performs computational and other operations. For example, in some implementations, processor 102 is or includes one or more central processing units (CPU), graphics processing units (GPU), embedded processors, application specific integrated circuits (ASICs), microcontrollers, and/or other functional blocks.

Figure 2:
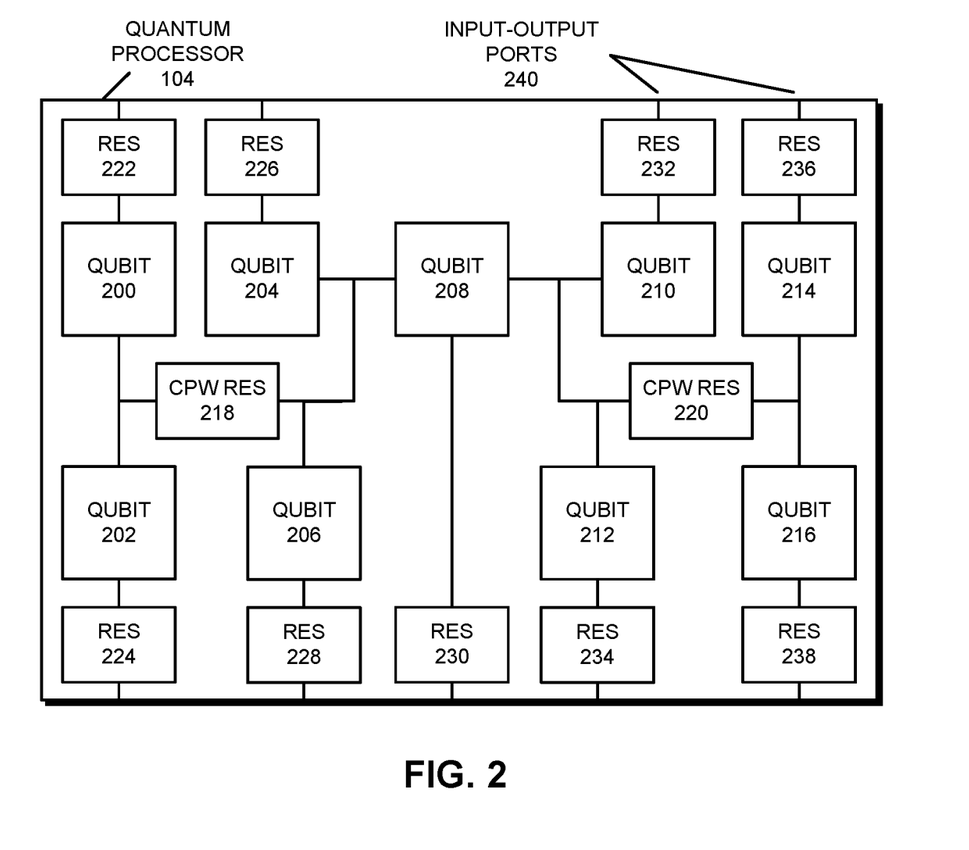
FIG. 2 presents a block diagram illustrating a quantum processor in accordance with some implementations.

Quantum processor 104 is a functional block that performs computational and other operations. Quantum processor 104 uses properties of or associated with quantum states for quantum elements, e.g., superposition, entanglement, etc., to perform computations. In some implementations, quantum processor 104 includes quantum bits, or qubits, that are used for performing computations. FIG. 2 presents a block diagram illustrating a quantum processor 104 in accordance with some implementations. Quantum processor 104 is a superconducting quantum processor that includes nine transmon qubits 200-216 (e.g., implemented using Josephson junctions). Quantum processor 104 also includes two superconducting coplanar waveguide resonators (CPW RES) 218-220 that serve as quantum busses. Quantum processor 104 further includes readout resonators (RES) 222-238 for controlling and measuring/reading out respective qubits 200-216 via corresponding input-output ports (only two of which are labeled in FIG. 2 as input-output ports 240 for clarity).

In the described implementations, processor 102 and quantum processor 104 are used in combination in a "hybrid" scheme for running quantum programs on quantum processor 104. For the hybrid scheme, processor 102 initiates runs of a quantum program on quantum processor 104 by causing the quantum program to be run on quantum processor 104—and possibly setting parameters for the quantum program prior to some or all of the runs of the quantum program. Processor 102 also acquires outputs generated while running the quantum program on quantum processor 104 and determines an overall output for the quantum program based on the outputs of the individual runs of the quantum program.

In the described implementations, for the above-described hybrid scheme, processor 102 runs two or more instances of a quantum program substantially in parallel on quantum processor 104. For running the two or more instances of the quantum program, processor 102 selects a separate set qubits for each instance of the quantum program from among available qubits in quantum processor 104 (i.e., qubits 200-216). Processor 102 then runs each of the two or more instances of the quantum program substantially in parallel on respective separate sets of qubits. Processor 102 acquires the outputs from each instance of the quantum program from the respective set of the qubits to be used for generating the overall output (i.e., result) of the quantum program. Operations running instances of a quantum program substantially in parallel on a quantum processor are described in more detail below.

Although quantum processor 104 is shown with a particular arrangement of qubits and other elements, in some implementations, quantum processor 104 includes a different arrangement of qubits. For example, in some implementations, quantum processor 104 includes a 30×30 grid of qubits and/or other elements (e.g., resonators, input-output elements, and/or other elements). As other examples, in some implementations, quantum processor 104 includes arrangements of qubits and other elements similar to those in Google's Sycamore® quantum processor, International Business Machines Hummingbird® quantum processor, etc. Generally, in the described implementations, quantum processor 104 includes sufficient qubits and/or other elements to execute instances of a quantum program substantially in parallel as described herein.

Although electronic device 100 is shown in FIG. 1 as including only processor 102 and quantum processor 104, electronic device 100 is simplified for descriptive purposes. In some implementations, electronic device 100 includes other functional blocks and devices. For example, in some implementations, electronic device 100 includes one or more memory subsystems (e.g., a "main memory," etc.), human interface subsystems, networking subsystems, and/or electrical power subsystems. Generally, in the described implementations, electronic device 100 includes sufficient numbers and/or arrangements of functional blocks to perform the operations herein described.

Figure 3:
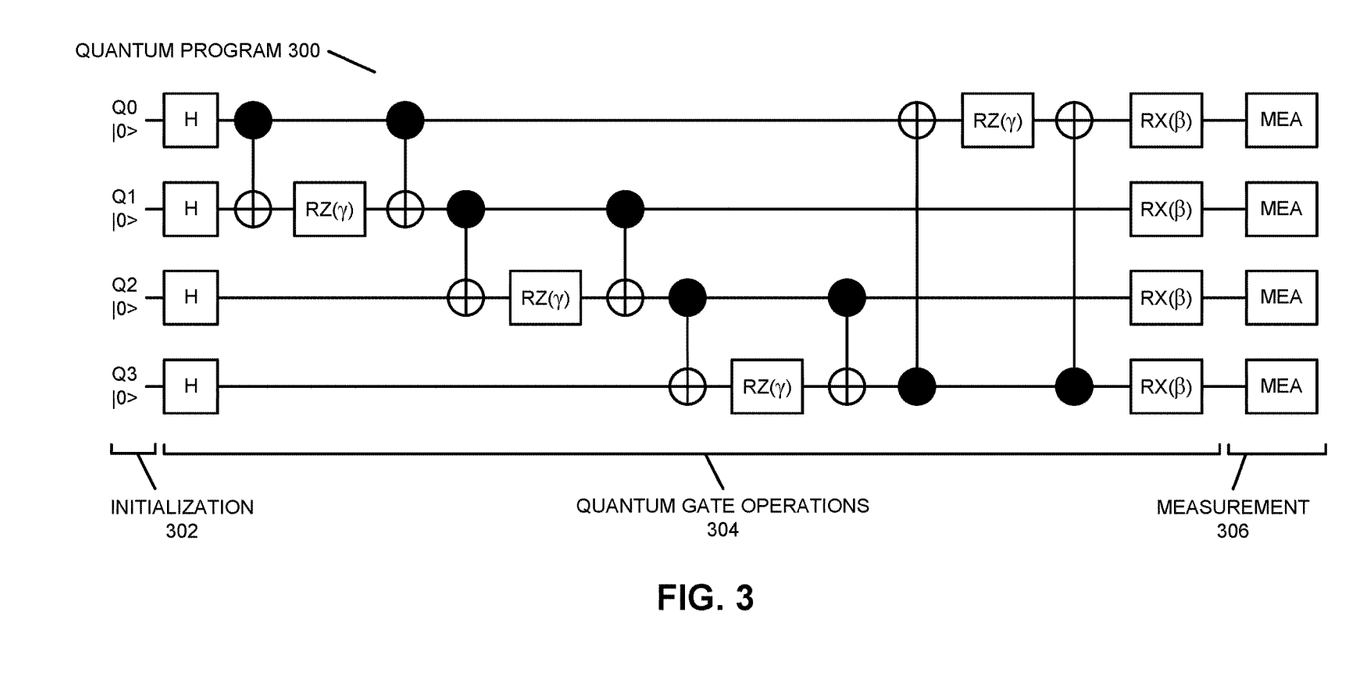
FIG. 3 presents a block diagram illustrating a quantum program in accordance with some implementations.

Electronic device 100 can be, or can be included in, any electronic device that performs computational operations. For example, electronic device 100 can be, or can be included in, quantum computers, desktop computers, servers, artificial intelligence apparatuses, virtual or augmented reality equipment, network appliances, etc., and/or combinations thereof Quantum Programs In the described implementations, a quantum program is run (i.e., executed, performed, etc.) on a quantum processor. Generally, a quantum program, which can also be called a "quantum circuit," is or includes a series of operations to be performed by a quantum processor on qubits (or other quantum entities and/or quantum data). FIG. 3 presents a block diagram illustrating a quantum program 300 in accordance with some implementations. In some implementations, a quantum program similar to the quantum program 300 is used for a quantum approximation optimization algorithm (QAOA), which is an algorithm for solving combinatorial optimization problems (e.g., for finding an optimal object in a set of objects).

Quantum program 300 can be considered to have three parts, with the first part being initialization 302 for a set of qubits, the second part being quantum gate operations 304 on the qubits, and the third part being measurement 306 of the quantum state of the qubits. For initialization 302, qubits Q0-Q4 ("the qubits") are placed in a desired quantum state, as shown via the well known |0> notation in FIG. 3. For quantum gate operations 304, a number of quantum gate operations are performed on/applied to individual qubits or pairs of the qubits. Using qubit Q0 as an example, a Hadamard quantum gate (H) is applied to qubit Q0 to map the qubit basis state |0> to two superposition states with equal weight of the basis states |0> and |1> (i.e., to create an evenly distributed quantum state for qubit Q0). A first controlled NOT (CNOT) quantum gate is applied to the Q0 and Q1 qubits, which flips the state of the Q1 qubit (i.e., the target qubit) when the Q0 qubit's (i.e., the control qubit's) state is |1>. A second CNOT quantum gate is applied to the Q0 and Q1 qubits. A third CNOT gate is applied to the Q0 and Q3 qubits, which flips the state of the Q0 qubit when the Q3 qubit's state is |1>. A Z-rotation quantum gate is applied to the Q0 qubit, which rotates the phase state of the qubit by $\gamma$ about the Z-axis. A fourth CNOT gate is applied to the Q0 and Q3 qubits. An X-rotation quantum gate is applied to the Q0 qubit, which rotates the phase state of the qubit by $\beta$ about the X-axis. For measurement 306, measurement elements (MEA) in the quantum processor measure the states of qubits Q0-Q3. The measurement elements return one or more values, such as bit values representative of the state of the respective qubits. For example, in some implementations, the measurement elements return a bit string or vector that separately represents the quantum state of each individual qubit.

Although a quantum program that uses four qubits is described as an example in FIG. 3, the described implementations are operable with a quantum program that uses a different number of qubits. In addition, although a number of quantum gate operations (e.g., Hadamard, CNOT, etc.) are used as an example in the quantum program, in some implementations additional or different quantum gate operations and/or different numbers of quantum gate operations are included in the quantum program. Generally, the described implementations are useable with quantum programs with any number of operations that use any number of qubits.

Hybrid Scheme

In the described implementations, a processor and a quantum processor (e.g., processor 102 and quantum processor 104) are used in combination in a hybrid scheme. Generally, for the hybrid scheme, the processor configures and runs a quantum program (e.g., quantum program 300) on the quantum processor and then generates an overall output for the quantum program based on outputs from running the quantum program returned by the quantum processor. For example, in some implementations, the quantum program is a variational quantum algorithm (VQA), which is a parameterized quantum program. In these implementations, the processor runs a VQA a number of times (e.g., hundreds of times) on a quantum processor and acquires a set of outputs that includes individual outputs from each of the runs of the VQA. The processor may also dynamically adjust the parameters for the VQA for subsequent runs of a VQA as some or all of the runs complete (e.g., based on a specified trend in output values, etc.). The processor then combines the outputs in the set of outputs to generate the overall output for the VQA. For example, the processor can compute an average, gradient descent, and/or other statistical value or values (e.g., a distribution, etc.) based on the outputs in the set of outputs.

Figure 4:
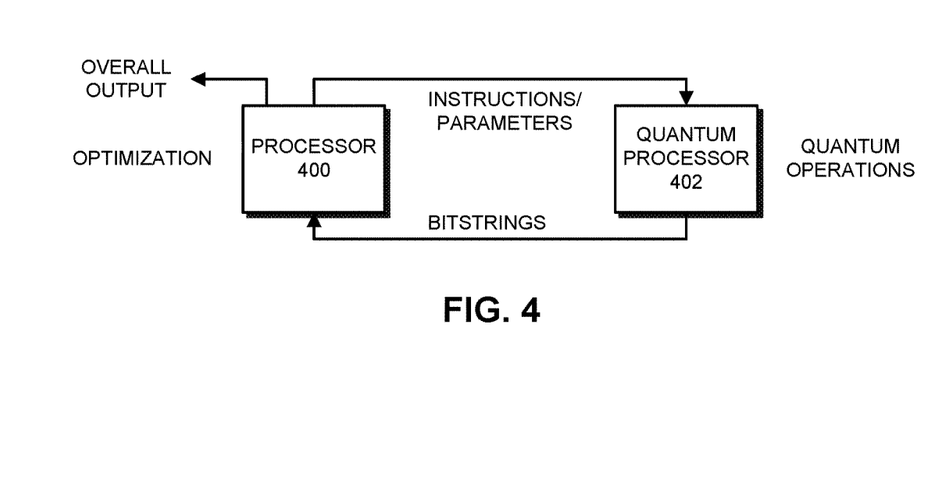
FIG. 4 presents a block diagram illustrating a hybrid scheme in accordance with some implementations.

FIG. 4 presents a block diagram illustrating a hybrid scheme in accordance with some implementations. As can be seen in FIG. 4, for the hybrid scheme, processor 400 configures a quantum program (e.g., a VQA such as quantum program 300) for running on quantum processor 402 and communicates a request to run the quantum program along with information about the configuration to quantum processor 402, which is shown as "INSTRUCTIONS/PARAMETERS." For example, processor 400 may determine values such as $\beta$ and $\gamma$ as shown in quantum program 300 for the run of the quantum program and communicate the values of $\beta$ and $\gamma$ to the quantum processor. Upon receiving the request, quantum processor 402 runs the quantum program using the configuration, which is shown as "QUANTUM OPERATIONS." Running the quantum program causes quantum processor 402 to generate outputs, which are returned to processor 400, which is shown as "BIT-STRINGS." Processor 400 can then configure the quantum program for a next run on the quantum processor, assuming that there is a next run, which is shown as "OPTIMIZATION." While running the quantum program on quantum processor 402 a specified number of times (as shown via the loop in FIG. 4), processor 400 collects a set of outputs from all of the runs of the quantum program. Note that the specified number of times may be a fixed/preset number of times, or the runs of the quantum program may continue until a completion condition is reached, such as a size in a change of the outputs between two or more iterations has been reached, etc. Processor 400 then generates an overall output (i.e., result) for the quantum program, which is shown as "OVERALL OUTPUT." based on the collected outputs—or at least some of the collected outputs, as deviant and/or erroneous outputs may be filtered/discarded, etc.

Qubits and Quantum Program Instances

In the described implementations, a quantum processor (e.g., quantum processor 104) includes a set of M qubits (or other quantum elements) that can be used for executing quantum programs (where M=65, 500, 4000, or another number). In some implementations, a quantum program to be run on the quantum processor requires N qubits to run, which can be less—and possibly much less—than all of the qubits available on the quantum processor. In these implementations, if a single instance of the quantum program was to be executed on the quantum processor alone, a number of the qubits would be left idle. Assuming that the difference between M and N is sufficiently large, in the described implementations, for the hybrid scheme, a processor can configure multiple instances of the quantum program to be executed substantially in parallel using the available qubits of the quantum processor. For example, if M=200 and N=45 (and other conditions are met), the processor can configure up to four instances of the quantum program to run substantially in parallel on the quantum processor.

Figure 5:
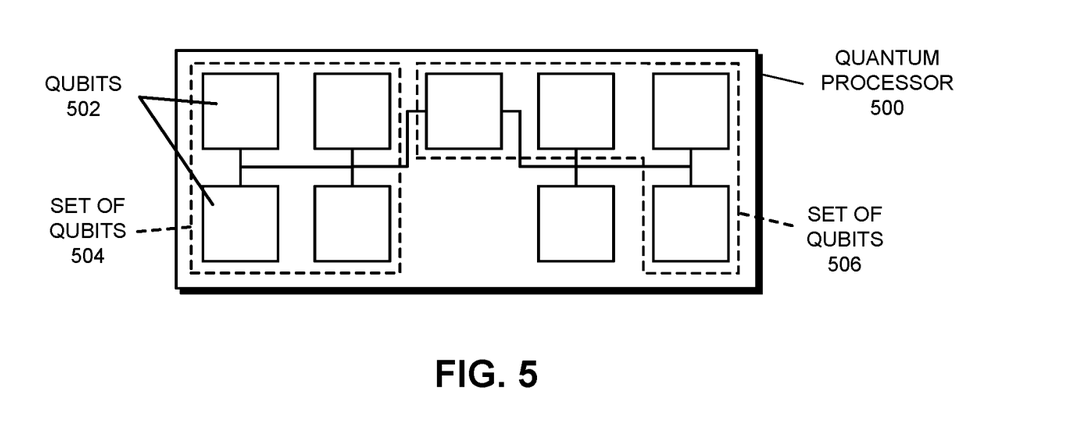
FIG. 5 presents a block diagram illustrating sets of qubits in accordance with some implementations.

FIG. 5 presents a block diagram illustrating a set of qubits in accordance with some implementations. As can be seen in FIG. 5, quantum processor 500 includes nine qubits 502 arranged with some similarity to the qubits in FIG. 2 (although intermediate elements shown in FIG. 2 are not shown and only two of the qubits are labeled for clarity). Assuming that a quantum program that uses four qubits (e.g., quantum program 300) is to be run on quantum processor 500 and the qubits support the operations of the quantum program, two instances of quantum program can be executed substantially in parallel on quantum processor 500. For example, a first instance of the quantum program can be run on set of qubits 504 and a second instance of the quantum program can be run on set of qubits 506. Note that the additional qubit that is not included in sets of qubits 504-506 may be left idle while the instances of the quantum program run substantially in parallel on quantum processor 500 and/or may be used for other operations.

In some implementations, a processor (e.g., processor 102) selects sets of qubits on which the instances of the quantum program are to be run. For example, the processor can select qubits to be included in each separate set of qubits based on operations of the quantum program and an arrangement of qubits in the quantum processor. In other words, based on the particular operations of the quantum program (e.g., quantum gates to be applied/used, relationships between qubits or groups thereof, etc.) and the operations that can be performed with/using some or all of the qubits in the quantum processor, the processor selects a respective set of qubits to be used for running each instance of the quantum program. For instance, if a particular connectivity or relationship between two or more qubits is required in order to run the quantum program and the quantum program has only X sets of two or more qubits that have the particular connectivity or relationship, the processor can select X sets of qubits (X=2, 4, or another number). Continuing the example in FIG. 5, assuming that the qubits in sets of qubits 504-506 are able to perform the operations of the quantum program, the processor can select (two) sets of qubits 504-506 for running instances of the quantum program substantially in parallel.

In some implementations, when selecting qubits to be included in sets of qubits as described above, the processor uses quality metrics associated with individual qubits and/or groups thereof to determine qubits to be included in sets of qubits. In these implementations, the processor, quantum processor, and/or another entity keeps quality metrics representative of the quality of outputs produced using the qubits and/or groups thereof. The quality metrics associated with the qubits and/or groups thereof can be representative of quantum gate fidelity for individual qubits or groups thereof; a measurement error rate for individual qubits or groups thereof; and a number and type of connections between qubits for individual qubits or groups thereof. In these implementations, the quality metrics can be scores associated with each qubit and/or group thereof and the processor can use aggregate scores for different combinations of qubits for selecting sets of qubits (assuming that the combinations of qubits are otherwise valid for running the quantum program). In some implementations, individual qubits and/or groups thereof with particularly low quality metrics or aggregate quality metrics may be excluded from being used for running instances of the quantum program—and thus may not be selected as or as part of sets of qubits. In some implementations, the processor attempts to balance the quality metrics between sets of qubits so that the selected sets of qubits are of approximately equal quality (i.e., to the extent possible, have similar aggregate quality scores).

In some implementations, instances of quantum program can be run substantially in parallel in two or more batches, with each batch having its own set of instances of the quantum program run substantially in parallel on qubits in the quantum processor. For example, for the above-described variational quantum algorithms, hundreds of instances of the VQA can be run, with only a small number of instances of the VQA being run substantially in parallel on the quantum processor in a batch at any given time. In these implementations, the above-described selection of the sets of qubits for running instances of the quantum program can be dynamic. That is, the processor can newly select sets of qubits for instances of the quantum program between each batch of multiple batches, after a given number of batches of multiple batches has been run, etc. In these implementations, the quality metrics associated with individual qubits and/or groups of qubits among qubits in a quantum processor that are used for selecting the sets of qubits can be quality metrics acquired from and/or during one or more prior batches. The processor can therefore monitor the runs of instances of the quantum program in batches and update/change the qubits in the sets of qubits used for running instances of the quantum program between batches.

Although a number of qubits 502 is shown in quantum processor 500 as an example, in some implementations, quantum processor 500 includes a different number of qubits. For example, in some implementations, quantum processor 500 includes 50, 500, 2000, or another number of qubits. In addition, although a particular arrangement and connectivity of qubits is shown in FIG. 5, in some implementations, quantum processor 500 includes a different arrangement and/or connectivity of qubits. Generally, the operations described herein can be performed using any number and arrangement of qubits in a quantum processor.

Process for Selecting Sets of Qubits

Figure 6:
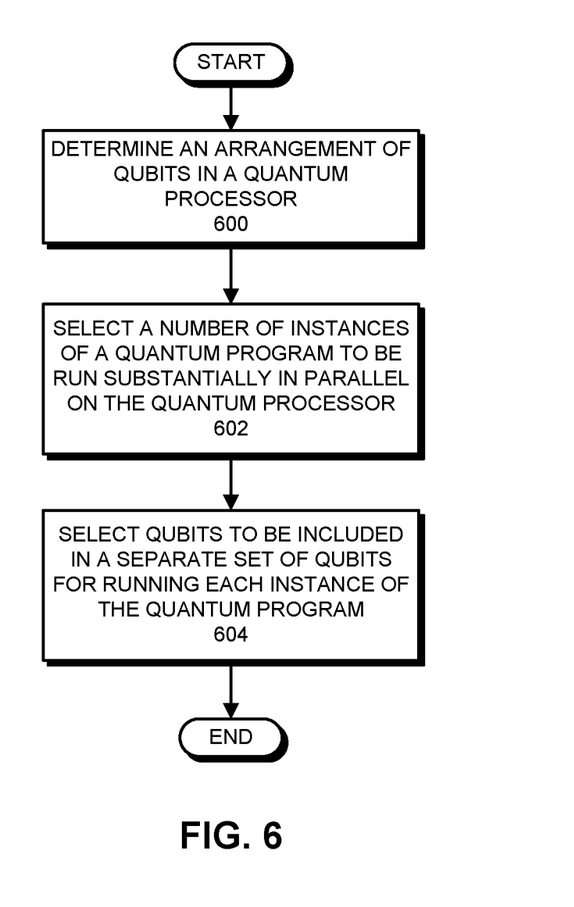
FIG. 6 presents a flowchart illustrating a process for selecting sets of qubits in accordance with some implementations.

In some implementations, a processor (e.g., processor 102) selects sets of qubits to be used for running instances of a quantum program substantially in parallel on a quantum processor (e.g., quantum processor 104). FIG. 6 presents a flowchart illustrating a process for selecting sets of qubits in accordance with some implementations. FIG. 6 is presented as a general example of operations performed in some implementations. In other implementations, however, different operations are performed and/or operations are performed in a different order. Additionally, although certain elements are used in describing the process (e.g., a processor, etc.), in some implementations, other elements perform the operations.

The process in FIG. 6 starts when the processor determines an arrangement of qubits in the quantum processor (step 600). For this operation, the processor acquires information about the available qubits in the quantum processor, such as an identification of the number of qubits, a connectivity between individual qubits or groups thereof, operations supported by individual qubits or groups thereof, quantum gates in the quantum processor, etc. For example, the processor can request the information from the quantum processor or other source, read the information from a qubit listing or configuration file retrieved from a memory (not shown), etc.

The processor then selects a number of instances of a quantum program to be run substantially in parallel on the quantum processor (step 602). For this operation, the processor uses the information about the qubits in the quantum processor to determine the number of instances of the quantum program to be run substantially in parallel. For example, assuming that the quantum program relies on a particular arrangement of qubits and there are only a given number of the particular arrangement of qubits in the quantum processor, the number of instances of the quantum program can be limited to the given number of instances (or less). As another example, assuming that the quantum program uses specified quantum gate operations and the quantum processor includes only two sets of qubits on which the quantum gate operation can be (or can efficiently be) performed, the number of instances of the quantum program can be limited to two instances.

The processor then selects qubits to be included in a separate set of qubits for running each instance of the quantum program (step 604). For this operation, the processor chooses the particular qubits from among the available qubits in the quantum processor to be included in the set of qubits for running each instance of the quantum program. For example, the processor can select qubits for each set of qubits so that qubit relationships relied on by the quantum program (e.g., neighboring qubits, qubits connected in specified ways, etc.) are satisfied. As another example, the processor can select qubits for each set of qubits so that quantum gate operations of the quantum program are able to be performed using qubits in the set of qubits. In some implementations, the processor selects the sets of qubits in order to minimize inefficient operations such as quantum state swaps, in which quantum state is moved among qubits in order to enable subsequent multi-qubit operations (CNOT, etc.) to be performed. In other words, the processor will, to the extent possible, select qubits to be included in each set of qubits that enable operations of the quantum program to be performed efficiently.

In some implementations, when selecting qubits to be included in the sets of qubits, the processor uses quality metrics associated with individual qubits and/or groups of qubits in the plurality of qubits to determine qubits to be included in each separate set of qubits. In these implementations, as described above, each qubit and/or group thereof is associated with one or more quality metrics that represent a "quality," or likelihood of precision and accuracy, of the qubit—in terms of the ability of the qubit to properly retain quantum state, to have its quantum state consistently measured, etc. The processor can compare the aggregate (e.g., total, average, mean, etc.) quality metrics for sets of qubits to one or more thresholds in order to ensure that aggregate quality metrics for the sets of qubits are adequate for running instances of the quantum program—and may not select sets of qubits for which the aggregate quality metrics are below the threshold. In some of these implementations, the processor mixes and matches qubits in order to ensure that sets of qubits do not end up with skewed distributions of quality metrics—i.e., so that aggregate quality metrics for the selected sets of qubits are approximately equal, rather than sets of qubits having widely disproportionate aggregate quality metrics.

Figure 7:
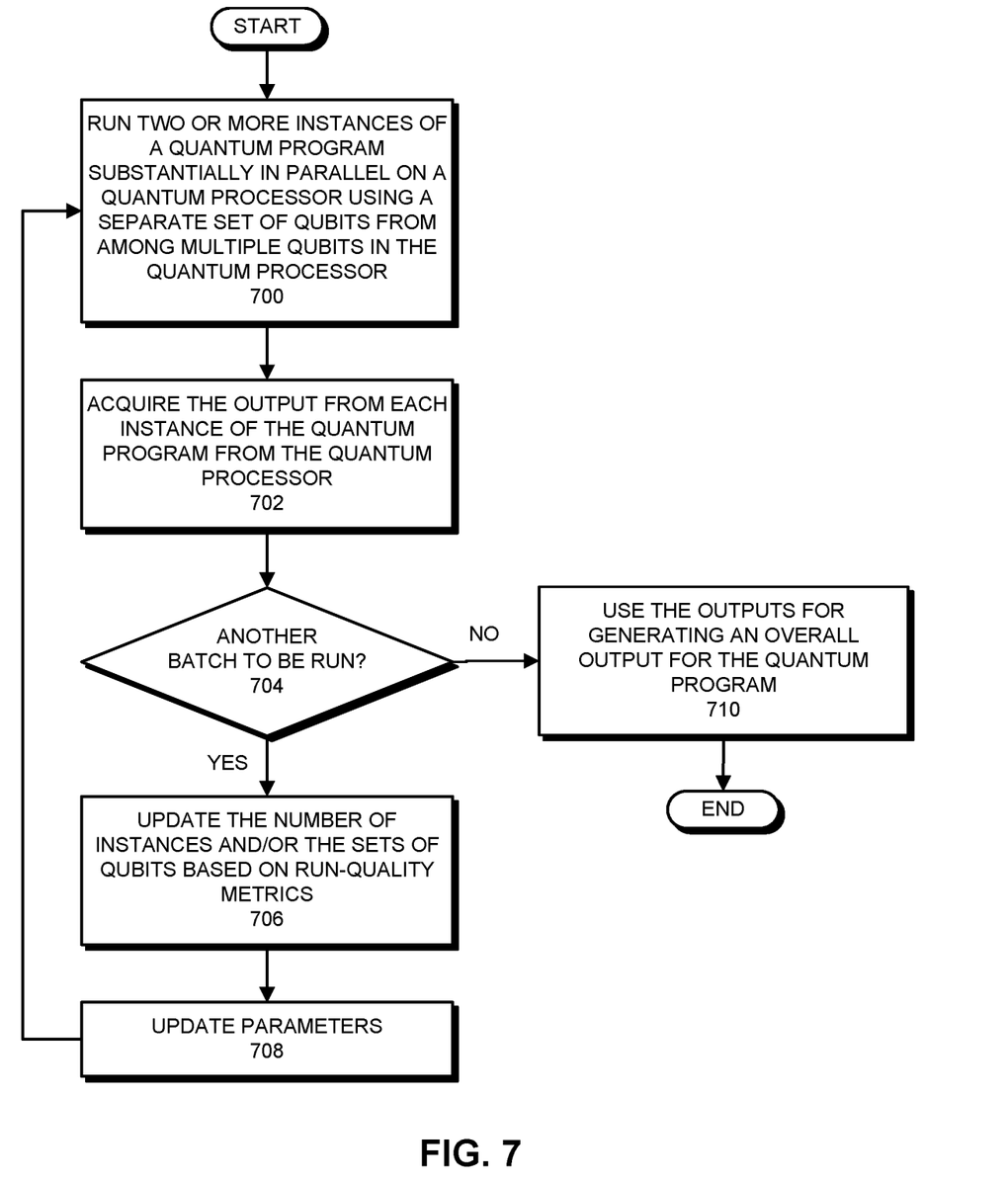
FIG. 7 presents a flowchart illustrating a process for running multiple instances of a quantum program substantially in parallel on a quantum processor in accordance with some implementations.

Process for Running Instances of a Quantum Program Substantially in Parallel on a Quantum Processor In the described implementations, a processor (e.g., processor 102) runs multiple instances of a quantum program (e.g., quantum program 300) substantially in parallel on a quantum processor (e.g., quantum processor 104). FIG. 7 presents a flowchart illustrating a process for running multiple instances of a quantum program substantially in parallel on a quantum processor in accordance with some implementations. FIG. 7 is presented as a general example of operations performed in some implementations. In other implementations, however, different operations are performed and/or operations are performed in a different order. Additionally, although certain elements are used in describing the process (e.g., a processor, etc.), in some implementations, other elements perform the operations.

In describing the operations of FIG. 7, the operations of FIG. 6 are assumed to have been performed. That is, the sets of qubits have been selected as described for steps 600-604.

It is further assumed that the quantum processor includes an adequate number and arrangement of qubits to enable running two or more instances of the quantum program substantially in parallel. In addition, for describing the operations of FIG. 7, each set of two or more instances of the quantum program are run substantially in parallel on the quantum processor are called, as a group, a batch. Multiple batches of the quantum program are run to generate outputs for the quantum program and the outputs from all of the batches are used for generating an overall output for the quantum program. For example, if the quantum program is a VQA for which 80 instances are to be run for generating outputs and a batch includes four instances of the VQA, 20 batches will be run.

The process in FIG. 7 starts when the processor runs two or more instances of a quantum program substantially in parallel the quantum processor using a separate set of qubits from among multiple qubits in the quantum processor (step 700). For this operation, the processor communicates a request to the quantum processor to run the two or more instances of the quantum program substantially in parallel on the quantum processor. For example, in some implementations, the processor sends a single request to the quantum processor that identifies (or possibly includes) the quantum program and the sets of qubits upon which each instance of the quantum program is to be run (e.g., by qubit numerical identifiers, position identifiers, etc.). As another, in some implementations, the processor sends a request associated with each instance of the quantum program to the quantum processor that identifies (or possibly includes) the quantum program and a particular set of qubits upon which that instance of the quantum program is to be run. In some implementations, the quantum program is parameterized (e.g., as with a VQA, etc.) and running the two or more instances of the quantum program includes the processor identifying values for the parameters to the quantum processor. For example, assuming quantum program 300 is the quantum program, identifying the values for the parameters includes identifying values for $\beta$ and/or $\gamma$.

For running each of the two or more instances of the quantum program substantially in parallel, the quantum processor initializes the qubits in the respective set of qubits to establish an initial quantum state for the respective set of qubits. The quantum processor then performs the quantum gate operations for each instance of the quantum program on the respective set of qubits. The quantum processor then measures, or "samples," the quantum state of the qubits in each of the respective sets of qubits to determine an output for the associated instance of the quantum program. In some implementations, the initialization, quantum gate operations, and measurement are generally similar to elements 302-306 of FIG. 3 (although the particular initialization values, quantum gate operations, etc. may differ). Recall that "substantially in parallel" means that, in some implementations, the two or more instances of the quantum program run concurrently on the quantum processor—and may be started at the same time (or close to the same time).

The processor then acquires the output from each instance of the quantum program from the quantum processor (step 702). For this operation, the processor requests and receives, reads, or is otherwise provided with a value of the output (e.g., a bitstring, a vector, and/or other data) for each instance of the quantum program. For example, in some implementations, the quantum processor communicates a signal indicating that the instances have completed running to the processor and the processor then reads memory locations, registers, etc. that are used for storing the values of the outputs in the quantum processor. After this operation is complete, the processor has a value of the output for each of the two or more instances of the quantum program that ran on the quantum processor.

In some implementations, the processor processes the outputs to determine outputs that appear to be of lower quality or incorrect (e.g., that deviate by more than a threshold from other outputs, etc.). In these implementations, the lower quality or incorrect outputs can be discarded—and therefore not used for subsequent steps in FIG. 7.

The processor then determines whether another batch of two or more instances of the quantum program is to be run (step 704). In other words, the processor determines whether (or not) more instance(s) of the quantum program are to be run in a subsequent batch to generate outputs to be used in generating the overall output for the quantum program. If so, the processor updates the number of instances and/or the sets of qubits based on run-quality metrics (step 706). For example, in some implementations, the processor can keep track of or otherwise acquire information (e.g., from the quantum processor) about the accuracy and precision, or "quality," of individual qubits and/or groups thereof and determine whether previously selected sets of qubits are providing satisfactory outputs for instances of the quantum program. If not, the processor can reselect sets of qubits (e.g., shuffle sets of qubits so that aggregate quality metrics for qubits are more balanced between the sets of qubits, etc.). As another example, the processor can monitor outputs from one or more batches and determine, based on trends in results between batches, consistency of results within a batch or between two or more batches, etc., that a different number of instances of the quantum program should be included in a subsequent batch. Note that, where the run-quality metrics prove to be acceptable (i.e., have not fallen below a threshold), the processor may leave the number of instances and/or the sets of qubits unchanged.

The processor then updates the parameters for the quantum program (step 708). For this operation, the processor uses the outputs of the instances of the quantum program for one or more batches to determine whether parameters of the quantum program are to be updated for a subsequent (and possibly multiple subsequent) runs of instances of the quantum program. For example, assuming quantum program 300 is the quantum program, this includes determining updated values for $\beta$ and/or $\gamma$. The processor then returns to step 700 to run a next two or more instances of a quantum program substantially in parallel the quantum processor using respective separate sets of qubits. Note that, where the parameters prove to be acceptable, the processor may leave the parameters unchanged.

Returning to step 704, when another batch is not to be run (step 704), the processor uses the outputs for generating an overall output for the quantum program (step 710). For this operation, the processor, which has acquired outputs from all batches in which two or more instances of the quantum program were run substantially in parallel on the quantum processor, processes the outputs to generate the overall output for the quantum program. For example, the processor can perform one or more mathematical, statistical, logical, and/or other operations on the outputs to generate the overall output. Following this operation, the process in FIG. 7 is complete.

In some implementations, for using the outputs for generating an overall output of the quantum program as shown in step 710, the processor uses quality metrics associated with the sets of qubits to control how much each output contributes to the overall output. In these implementations, lower-quality outputs can contribute less to (i.e., have less effect on) the overall output, whereas higher-quality outputs can contribute more. For this operation, the processor determines quality metrics associated with the separate set of qubits used for running each instance of the quantum program. As described above, the processor itself, the quantum processor, and/or another entity can keep quality metrics for each set of qubits (or for the individual qubits therein) and these quality metrics can be acquired by the processor. The processor then generates weighted outputs by weighting the output for each instance of the quantum program based on respective quality metrics. For example, the processor can multiply or otherwise adjust each output by a factor between 0-1, with values closer to 0 being associated with lower-quality sets of qubits and lessening the contribution of a given output to the overall output. The processor then uses the weighted outputs for generating the overall output of the quantum program such as described above (i.e., via statistical, mathematical, or logical operations).

In some implementations, at least one electronic device (e.g., electronic device 100, etc.) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR5 DRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some implementations, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), quantum processors, compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some implementations, the hardware modules include purpose-specific or dedicated circuitry that performs the operations "in hardware" and without executing instructions. In some implementations, the hardware modules include general purpose circuitry such as execution pipelines, compute or processing units, etc. that, upon executing instructions (e.g., program code, firmware, etc.), performs the operations.

In some implementations, a data structure representative of some or all of the functional blocks and circuit elements described herein (e.g., electronic device 100, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N and M. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some implementations.

The foregoing descriptions of implementations have been presented only for purposes of illustration and description. They are not intended to be exhaustive or to limit the implementations to the forms disclosed. Accordingly, many modifications and variations will be apparent to practitioners skilled in the art. Additionally, the above disclosure is not intended to limit the implementations. The scope of the implementations is defined by the appended claims.

What is claimed is:

1. An electronic device, comprising:
a quantum processor that includes a plurality of qubits; and
a processor configured to:
run a plurality of instances of a quantum program substantially in parallel on the quantum processor using a separate set of qubits from among the plurality of qubits for each instance of the quantum program;
acquire an output for each instance of the quantum program from the quantum processor; and
generating a combined output of the quantum program by combining the output for each instance of the quantum program with one another via one or more of mathematical, statistical, or logical operations.

2. The electronic device of claim 1, wherein the processor is further configured to select qubits to be included in each separate set of qubits based on operations of the quantum program and an arrangement of qubits in the plurality of qubits.

3. The electronic device of claim 2, wherein the processor is further configured to use a quality metric associated with individual qubits and/or groups of qubits in the plurality of qubits to determine the qubits to be included in each separate set of qubits.

4. The electronic device of claim 2, wherein the processor is further configured to select the qubits based on a number of times that a quantum state is to be moved between the qubits while running each instance of the quantum program.

5. The electronic device of claim 1, wherein the processor is further configured to select a number of instances of the quantum program to be run substantially in parallel on the quantum processor based on operations of the quantum program and an arrangement of qubits in the plurality of qubits.

6. The electronic device of claim 5, wherein the processor is further configured to:
collect run-quality metrics after the instances of the quantum program have run substantially in parallel on the quantum processor; and
select a number of instances of the quantum program to be subsequently run substantially in parallel on the quantum processor based at least in part on the run-quality metrics.

7. The electronic device of claim 1, wherein the processor is configured to:
generate weighted outputs by weighting the output for each instance of the quantum program based on a respective quality metric associated with the separate set of qubits used for running each instance of the quantum program; and
use the weighted outputs for generating the combined output of the quantum program.

8. The electronic device of claim 7, wherein the quality metric associated with each separate set of qubits is based on:
a quantum gate fidelity for that separate set of qubits;
a measurement error rate for that separate set of qubits; and
a number of connections between qubits in that separate set of qubits.

9. The electronic device of claim 1, wherein the processor is configured to generate the combined output of the quantum program using the outputs for the instances of the quantum program in combination with outputs of a specified number of other instances of the quantum program, wherein the other instances of the quantum program are run on the quantum processor at a different time than the instances of the quantum program.

10. The electronic device of claim 1, wherein:
the quantum program is a variational quantum algorithm to be run a specified number of times to generate a set of individual outputs, the individual outputs being used to generate an output for the variational quantum algorithm.

11. A method comprising:
running a plurality of instances of a quantum program substantially in parallel on a quantum processor that includes a plurality of qubits using a separate set of qubits from among the plurality of qubits for each instance of the quantum program;
acquiring an output for each instance of the quantum program from the quantum processor; and
generating a combined output of the quantum program by combining the output for each instance of the quantum program with one another via one or more of mathematical, statistical, or logical operations.

12. The method of claim 11, further comprising:
selecting qubits to be included in each separate set of qubits based on operations of the quantum program and an arrangement of qubits in the plurality of qubits.

13. The method of claim 12, further comprising:
using a quality metric associated with individual qubits and/or groups of qubits in the plurality of qubits to determine the qubits to be included in each separate set of qubits.

14. The method of claim 12, further comprising:
selecting the qubits based on a number of times that a quantum state is to be moved between the qubits while running each instance of the quantum program.

15. The method of claim 11, further comprising:
selecting a number of instances of the quantum program to be run substantially in parallel on the quantum processor based on operations of the quantum program and an arrangement of qubits in the plurality of qubits.

16. The method of claim 15, further comprising:
collecting run-quality metrics after the instances of the quantum program have run substantially in parallel on the quantum processor; and
selecting a number of instances of the quantum program to be subsequently run substantially in parallel on the quantum processor based at least in part on the run-quality metrics.

17. The method of claim 11, further comprising:
generating weighted outputs by weighting the output for each instance of the quantum program based on a respective quality metric associated with the separate set of qubits used for running each instance of the quantum program; and
using the weighted outputs for generating the combined output of the quantum program.

18. The method of claim 17, wherein the quality metric associated with each separate set of qubits is based on:
a quantum gate fidelity for that separate set of qubits;
a measurement error rate for that separate set of qubits; and
a number of connections between qubits in that separate set of qubits.

19. The method of claim 11, further comprising:
generating the combined output of the quantum program using the outputs for the instances of the quantum program in combination with outputs of a specified number of other instances of the quantum program, wherein the other instances of the quantum program are run on the quantum processor at a different time than the instances of the quantum program.

20. The method of claim 11, wherein:
the quantum program is a variational quantum algorithm to be run a specified number of times to generate a set of individual outputs, the individual outputs being used to generate an output for the variational quantum algorithm.

* * * * *